(12) United States Patent
Tetsui

(10) Patent No.: US 10,519,596 B2
(45) Date of Patent: *Dec. 31, 2019

(54) METHOD FOR PRODUCING LEATHER-LIKE SHEET

(71) Applicant: DIC Corporation, Tokyo (JP)

(72) Inventor: Tomohiro Tetsui, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/555,474

(22) PCT Filed: Feb. 9, 2016

(86) PCT No.: PCT/JP2016/053772
§ 371 (c)(1),
(2) Date: Sep. 1, 2017

(87) PCT Pub. No.: WO2016/140025
PCT Pub. Date: Sep. 9, 2016

(65) Prior Publication Data
US 2018/0030650 A1   Feb. 1, 2018

(30) Foreign Application Priority Data

Mar. 3, 2015 (JP) ................................ 2015-041243

(51) Int. Cl.

| | | |
|---|---|---|
| *D06N 3/14* | (2006.01) | |
| *C08G 18/34* | (2006.01) | |
| *C08G 18/44* | (2006.01) | |
| *C08G 18/48* | (2006.01) | |
| *C08G 18/65* | (2006.01) | |
| *C08G 18/66* | (2006.01) | |
| *C08G 18/76* | (2006.01) | |
| *C09D 175/04* | (2006.01) | |
| *C09D 175/08* | (2006.01) | |
| *C09D 7/40* | (2018.01) | |
| *C09D 5/00* | (2006.01) | |
| *B32B 27/40* | (2006.01) | |
| *C08G 18/79* | (2006.01) | |
| *C08G 18/08* | (2006.01) | |
| *C08G 18/24* | (2006.01) | |
| *C08G 18/32* | (2006.01) | |
| *C08G 18/42* | (2006.01) | |
| *C09J 175/04* | (2006.01) | |

(52) U.S. Cl.
CPC ............. *D06N 3/14* (2013.01); *B32B 27/40* (2013.01); *C08G 18/0823* (2013.01); *C08G 18/244* (2013.01); *C08G 18/3206* (2013.01); *C08G 18/348* (2013.01); *C08G 18/4277* (2013.01); *C08G 18/44* (2013.01); *C08G 18/48* (2013.01); *C08G 18/4854* (2013.01); *C08G 18/6541* (2013.01); *C08G 18/6625* (2013.01); *C08G 18/6659* (2013.01); *C08G 18/6692* (2013.01); *C08G 18/7671* (2013.01);

*C08G 18/797* (2013.01); *C09D 5/00* (2013.01); *C09D 7/40* (2018.01); *C09D 175/04* (2013.01); *C09D 175/08* (2013.01); *C09J 175/04* (2013.01); *C08G 2170/80* (2013.01)

(58) Field of Classification Search
CPC ... D06N 3/14; C09D 7/40; C09D 5/00; C09D 175/04; C09D 175/08; B32B 27/40; C08G 18/0823; C08G 18/244; C08G 18/3206; C08G 18/348; C08G 18/4277; C08G 18/44; C08G 18/48; C08G 18/4854; C08G 18/6541; C08G 18/6625; C08G 18/6659; C08G 18/6692; C08G 18/7671; C08G 18/797; C08G 2170/80; C09J 175/04
USPC ........................................................ 524/369
See application file for complete search history.

(56) References Cited

U.S. PATENT DOCUMENTS

| | | |
|---|---|---|
| 5,891,580 A | 4/1999 | Fricke et al. |
| 2016/0208432 A1 | 7/2016 | Tetsui |

FOREIGN PATENT DOCUMENTS

| | | |
|---|---|---|
| JP | H07-041539 A | 2/1995 |
| JP | H08-246355 A | 9/1996 |
| JP | 10-025664 A | 1/1998 |
| JP | H11-012458 A | 1/1999 |

(Continued)

OTHER PUBLICATIONS

WO 2013/027489 A1, machine translation, Google Patents. (Year: 2013).*

(Continued)

*Primary Examiner* — Josephine L Chang
(74) *Attorney, Agent, or Firm* — McDermott Will & Emery LLP

(57) ABSTRACT

A problem to be solved by the invention is to provide a method for producing leather-like sheets with excellent chemical resistance and discoloration resistance utilizing an aqueous urethane resin composition. The invention provides a method for producing a leather-like sheet in the form of a laminate including a film, the method including forming the film by applying an aqueous urethane resin composition onto a substrate and drying the composition, the aqueous urethane resin composition including a urethane resin, a nonionic emulsifier and an aqueous medium, the urethane resin being one obtained by reacting a polyol including a carboxyl group-containing polyol, an aromatic polyisocyanate and a chain extender, the urethane resin having a urea bond content of not more than 0.3 mol/kg. The film is preferably used as a skin layer and/or a topcoat layer of the leather-like sheet.

2 Claims, No Drawings

(56) References Cited

FOREIGN PATENT DOCUMENTS

| JP | H11-335975 A | 12/1999 | | |
|---|---|---|---|---|
| JP | 2000-096457 A | 4/2000 | | |
| JP | 2000-290879 A | 10/2000 | | |
| JP | 2004-043519 A | 2/2004 | | |
| JP | 2004-143641 A | 5/2004 | | |
| JP | 2005-126670 A | 5/2005 | | |
| JP | 2006-096852 A | 4/2006 | | |
| JP | 2006-336178 A | 12/2006 | | |
| JP | 2007-099870 A | 4/2007 | | |
| JP | 2013-217006 A | 10/2013 | | |
| WO | 2000/46301 A1 | 8/2000 | | |
| WO | WO-2013027489 A1 * | 2/2013 | ............. | C08G 18/44 |
| WO | 2015/033732 A1 | 3/2015 | | |

OTHER PUBLICATIONS

International Search Report issued in Application No. PCT/JP2016/053772 dated May 17, 2016, with English translation.
European Extended Search Report dated May 2, 2017, issued in European Patent Application No. EP1484 2214.0.
International Search Report PCT/JP2014/070844 dated Oct. 28, 2014 with English translation.

* cited by examiner

METHOD FOR PRODUCING LEATHER-LIKE SHEET

RELATED APPLICATIONS

This application is the U.S. National Phase under 35 U.S.C. § 371 of International Application No. PCT/JP2016/053772, filed on Feb. 9, 2016, which in turn claims the benefit of Japanese Application No. 2015-041243, filed on Mar. 3, 2015, the disclosures of which are incorporated by reference herein.

TECHNICAL FIELD

The present invention relates to a method for producing a leather-like sheet having excellent chemical resistance and discoloration resistance.

BACKGROUND ART

Aqueous urethane resin compositions which are dispersions of a urethane resin in an aqueous medium have recently gained new use in leather-like sheets because of their small environmental loads as compared to conventional urethane resin compositions containing an organic solvent (see, for example, Patent Literature 1).

Unfortunately, films obtained from the existing aqueous urethane resin compositions are poor in chemical resistance and have drawbacks in that they are swollen during use or are degraded and broken. Improvements are thus demanded.

CITATION LIST

Patent Literature

PTL 1: Japanese Unexamined Patent Application Publication No. 11-335975

SUMMARY OF INVENTION

Technical Problem

A problem to be solved by the present invention is to provide a method for producing leather-like sheets with excellent chemical resistance and discoloration resistance utilizing an aqueous urethane resin composition.

Solution to Problem

The present invention provides a method for producing a leather-like sheet in the form of a laminate including a film, the method including forming the film by applying an aqueous urethane resin composition onto a substrate and drying the composition, the aqueous urethane resin composition including a urethane resin (A), a nonionic emulsifier (B) and an aqueous medium (C), the urethane resin (A) being one obtained by reacting a polyol (a1) including a carboxyl group-containing polyol (a1-1), an aromatic polyisocyanate (a2) and a chain extender (a3), the urethane resin (A) having a urea bond content of not more than 0.3 mol/kg.

Advantageous Effects of Invention

Leather-like sheets obtained by the production method of the present invention are excellent in chemical resistance and discoloration resistance.

DESCRIPTION OF EMBODIMENTS

In the method for producing leather-like sheets according to the present invention, an aqueous urethane resin composition includes a urethane resin (A), a nonionic emulsifier (B) and an aqueous medium (C) wherein the urethane resin (A) is one which is obtained by reacting a polyol (a1) including a carboxyl group-containing polyol (a1-1), an aromatic polyisocyanate (a2) and a chain extender (a3) and which has a urea bond content of not more than 0.3 mol/kg. The production method essentially includes applying the composition onto a substrate and drying the composition. The resultant film is preferably used as a skin layer and/or a topcoat layer of a leather-like sheet.

For example, the carboxyl group-containing polyol (a1-1) may be, among others, 2,2'-dimethylolpropionic acid, 2,2'-dimethylolbutanoic acid, 2,2'-dimethylolbutyric acid or 2,2'-valeric acid. These compounds may be used singly, or two or more may be used in combination.

As a result of the use of the carboxyl group-containing polyol (a1-1), the urethane resin (A) is an anionic urethane resin containing a carboxyl group. Anionic urethane resins have low water swellability by water or chemicals compared to other resins such as nonionic urethane resins having high solvation properties, and thus can provide excellent chemical resistance. Consequently, excellent chemical resistance and dispersion stability in water can be attained at the same time.

The content of the polyol (a1-1) is preferably in the range of 0.05 to 10 mass %, and more preferably in the range of 0.1 to 7 mass % of the polyols (a1). This content is advantageous in that higher chemical resistance is obtained.

Some example polyols which may be used as the polyols (a1) in addition to the polyol (a1-1) are polyether polyols, polyester polyols, polycarbonate polyols, dimer diols, acrylic polyols and polybutadiene polyols. These polyols may be used singly, or two or more may be used in combination. For the reason that a further enhancement in durability can be attained, it is preferable to use one or more polyols selected from the group consisting of polyether polyols, polyester polyols and polycarbonate polyols. It is more preferable to use a polycarbonate polyol because the carbonate structures are particularly excellent in chemical resistance and consequently the oleic acid resistance can be further enhanced.

From the points of view of chemical resistance and durability, the number average molecular weight of the above polyol is preferably in the range of 500 to 8,000, and more preferably in the range of 800 to 3,000. The number average molecular weight of the above polyol is a value measured by a gel permeation column chromatography (GPC) method under the following conditions.

Measurement apparatus: High-performance GPC apparatus ("HLC-8220GPC" manufactured by TOSOH CORPORATION)
Columns: The following columns manufactured by TOSOH CORPORATION were connected in series.
  "TSKgel G5000" (7.8 mm I.D.×30 cm)×1 column
  "TSKgel G4000" (7.8 mm I.D.×30 cm)×1 column
  "TSKgel G3000" (7.8 mm I.D.×30 cm)×1 column
  "TSKgel G2000" (7.8 mm I.D.×30 cm)×1 column
Detector: RI (differential refractometer)
Column temperature: 40° C.
Eluent: tetrahydrofuran (THF)
Flow rate: 1.0 mL/min
Injection volume: 100 µL (tetrahydrofuran solution with a sample concentration of 0.4 mass %)

Standard samples: A calibration curve was prepared using the following standard polystyrenes.
(Standard polystyrenes)
"TSKgel standard polystyrene A-500" manufactured by TOSOH CORPORATION
"TSKgel standard polystyrene A-1000" manufactured by TOSOH CORPORATION
"TSKgel standard polystyrene A-2500" manufactured by TOSOH CORPORATION
"TSKgel standard polystyrene A-5000" manufactured by TOSOH CORPORATION
"TSKgel standard polystyrene F-1" manufactured by TOSOH CORPORATION
"TSKgel standard polystyrene F-2" manufactured by TOSOH CORPORATION
"TSKgel standard polystyrene F-4" manufactured by TOSOH CORPORATION
"TSKgel standard polystyrene F-10" manufactured by TOSOH CORPORATION
"TSKgel standard polystyrene F-20" manufactured by TOSOH CORPORATION
"TSKgel standard polystyrene F-40" manufactured by TOSOH CORPORATION
"TSKgel standard polystyrene F-80" manufactured by TOSOH CORPORATION
"TSKgel standard polystyrene F-128" manufactured by TOSOH CORPORATION
"TSKgel standard polystyrene F-288" manufactured by TOSOH CORPORATION
"TSKgel standard polystyrene F-550" manufactured by TOSOH CORPORATION The aromatic polyisocyanate (a2) is essential for obtaining excellent chemical resistance and texture. For example, the aromatic polyisocyanate (a2) may be, among others, phenylene diisocyanate, tolylene diisocyanate, diphenylmethane diisocyanate, naphthalene diisocyanate, polymethylenepolyphenyl polyisocyanate or carbodiimidized diphenylmethane polyisocyanate. These aromatic polyisocyanates may be used singly, or two or more may be used in combination. Of these, diphenylmethane diisocyanate is preferably used for the reason that chemical resistance and texture can be further enhanced.

The aromatic polyisocyanate (a2) may be used in combination with an additional polyisocyanate as required. Examples of such additional polyisocyanates include aliphatic or alicyclic polyisocyanates such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate and norbornene diisocyanate. These polyisocyanates may be used singly, or two or more may be used in combination.

The chain extender (a3) is an essential component which causes the urethane resin (A) to form a hard segment and allows excellent chemical resistance to be obtained. Examples of the chain extenders include those having a hydroxyl group and those having an amino group. The chain extenders may be used singly, or two or more may be used in combination.

Examples of the hydroxyl group-containing chain extenders include aliphatic polyol compounds such as ethylene glycol, diethylene glycol, triethylene glycol, propylene glycol, 1,3-propanediol, 1,3-butanediol, 1,4-butanediol, hexamethylene glycol, saccharose, methylene glycol, glycerin and sorbitol; aromatic polyol compounds such as bisphenol A, 4,4'-dihydroxydiphenyl, 4,4'-dihydroxydiphenyl ether, 4,4'-dihydroxydiphenylsulfone, hydrogenated bisphenol A and hydroquinone; and water. These chain extenders may be used singly, or two or more may be used in combination. In particular, an aliphatic polyol compound is preferably used because of high availability of raw materials and the ease in controlling the discoloration resistance.

Examples of the amino group-containing chain extenders include ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, hydrazine, diethylenetriamine and triethylenetetramine. These chain extenders may be used singly, or two or more may be used in combination.

For the reason that the durability of films can be further enhanced, the amount in which the chain extender (a3) is used is preferably in the range of 0.5 to 20 mass %, and more preferably in the range of 1 to 10 mass % of the total mass of the polyols (a1), the aromatic polyisocyanate (a2) and the chain extender (a3).

In the present invention, it is essential that the urethane resin (A) be one having a content of urea bonds of not more than 0.3 mol/kg. If the urea bond content in the urethane resin (A) exceeds 0.3 mol/kg, the obtainable films are problematically discolored with time or deteriorated in chemical resistance. For the reason that chemical resistance and discoloration resistance can be further enhanced, the urea bond content is preferably not more than 0.2 mol/kg, more preferably not more than 0.1 mol/kg, and still more preferably not more than 0.05 mol/kg.

The urea bonds are formed by the reaction of the amino groups present in the chain extender (a3) and/or amino groups resulting from water-isocyanate reaction, with the polyisocyanate. Accordingly, the content of the urea bonds in the urethane resin (A) may be controlled by controlling the amount of the amino group-containing chain extender used as the chain extender (a3) and further converting all the isocyanates into urethanes before emulsification. The urea bond content is a value calculated using the equation (1) below.

[Math. 1]

$$\text{Urea bond content (mol/kg)} = \frac{\begin{array}{c}(\text{Number of moles of amino groups}) + \\ (\text{Number of moles of isocyanate groups} - \\ \text{Number of moles of hydroxyl groups} - \\ \text{Number of moles of amino groups})/2\end{array}}{\begin{array}{c}\text{Mass of polyols } (a1) + \\ \text{Mass of aromatic polyisocyanate } (a2) + \\ \text{Mass of chain extender } (a3)\end{array}} \quad (1)$$

Examples of the methods for producing the urethane resin (A) include a method in which the polyols (a1) are reacted with the aromatic polyisocyanate (a1) to give an isocyanate group-containing urethane prepolymer, and the urethane prepolymer is reacted with the chain extender (a3); and a method in which the polyols (a1), the aromatic polyisocyanate (a2) and the chain extender (a3) are fed and reacted at once. For example, these reactions are preferably performed at a temperature of 50 to 100° C. for 3 to 10 hours.

The molar ratio of the isocyanate groups present in the aromatic polyisocyanate (a2) to the total of the hydroxyl groups present in the polyols (a1) and the hydroxyl groups and/or the amino groups present in the chain extender (a3) [(isocyanate groups)/(total of hydroxyl groups and amino groups)] is preferably in the range of 0.8 to 1.2, and more preferably in the range of 0.9 to 1.1.

In the production of the urethane resin (A), it is preferable to deactivate the isocyanate groups remaining in the urethane resin (A). The deactivation of the isocyanate groups preferably involves a monohydric alcohol such as methanol. When such an alcohol is used, the amount thereof is preferably in the range of 0.001 to 10 parts by mass per 100 parts by mass of the urethane resin (A).

The production of the urethane resin (A) may involve an organic solvent. Examples of the organic solvents include ketone compounds such as acetone and methyl ethyl ketone; ether compounds such as tetrahydrofuran and dioxane; acetate ester compounds such as ethyl acetate and butyl acetate; nitrile compounds such as acetonitrile; and amide compounds such as dimethylformamide and N-methylpyrrolidone. These organic solvents may be used singly, or two or more may be used in combination. It is preferable that the organic solvent be removed by a method such as distillation during the production of the aqueous urethane resin composition.

For the reasons that the obtainable films are further enhanced in mechanical strength, are more easily prevented from discoloration with time, and attain further enhancements in chemical resistance and texture, the content of aromatic rings in the urethane resin (A) obtained by the above method is preferably in the range of 0.3 to 5 mol/kg, and more preferably in the range of 0.3 to 3 mol/kg.

The nonionic emulsifier (B) is an essential component for ensuring that the urethane resin (A) will attain excellent dispersion stability in water in spite of its having aromatic rings, and that excellent chemical resistance will be obtained. Excellent dispersion stability in water may be obtained by the use of the emulsifier which has a nonionic group having high water dispersion stability. Further, because the emulsifier is not introduced into the urethane resin (A), swelling by chemicals ascribed to the nonionic groups can be prevented. Examples of the nonionic emulsifiers (B) include those nonionic emulsifiers having an oxyethylene group such as polyoxyethylene nonylphenyl ether, polyoxyethylene octylphenyl ether, polyoxyethylene distyrenated phenyl ether, polyoxyethylene lauryl ether, polyoxyethylene oleyl ether, polyoxyethylene stearyl ether and polyoxyethylene sorbitol tetraoleate. Because dispersion stability in water and chemical resistance can be further enhanced, the average number of moles of oxyethylene groups added is preferably in the range of 1 to 50, more preferably in the range of 3 to 30, and still more preferably in the range of 5 to 20. These nonionic emulsifiers may be used singly, or two or more may be used in combination.

Because dispersion stability in water and chemical resistance can be further enhanced, the amount in which the nonionic emulsifier (B) is used is preferably in the range of 0.1 to 30 parts by mass, and more preferably in the range of 1 to 10 parts by mass per 100 parts by mass of the urethane resin (A).

For example, the aqueous medium (C) may be, among others, water, a water-miscible organic solvent, or a mixture thereof. Examples of the water-miscible organic solvents include alcohol solvents such as methanol, ethanol, and n- and iso-propanol; ketone solvents such as acetone and methyl ethyl ketone; polyalkylene glycol solvents such as ethylene glycol, diethylene glycol and propylene glycol; polyalkylene glycol alkyl ether solvents; and lactam solvents such as N-methyl-2-pyrrolidone. These aqueous media may be used singly, or two or more may be used in combination. From the points of view of safety and the reduction of environmental loads, the medium used is preferably water alone or a mixture of water and a water-miscible organic solvent, and is more preferably water alone.

Because further enhancements in workability and film texture can be attained, the mass ratio of the urethane resin (A) to the aqueous medium (C) [(A)/(C)] is preferably in the range of 10/80 to 70/30, and more preferably in the range of 20/80 to 60/40.

The aqueous urethane resin composition used in the present invention contains the urethane resin (A), the nonionic emulsifier (B) and the aqueous medium (C) as the essential components, and may further contain a neutralizer, a crosslinking agent and additional additives as required.

The neutralizer neutralizes the carboxyl groups in the urethane resin (A). Examples thereof include nonvolatile bases such as sodium hydroxide and potassium hydroxide; and tertiary amine compounds such as trimethylamine, triethylamine, dimethylethanolamine, methyldiethanolamine and triethanol. These neutralizers may be used singly, or two or more may be used in combination.

When used, the neutralizer is preferably added in such an amount that its molar ratio to the number of moles of the carboxyl groups present in the urethane resin (A) is in the range of 0.8 to 1.2.

The crosslinking agent forms crosslinks with the urethane resin (A) and serves to provide a further enhancement in mechanical strength. Examples thereof include known melamine crosslinking agents, epoxy crosslinking agents, oxazoline crosslinking agents, carbodiimide crosslinking agents and isocyanate crosslinking agents.

When the crosslinking agent is used, the amount thereof is preferably in the range of 0.01 to 5 parts by mass per 100 parts by mass of the urethane resin composition (A).

Examples of the additional additives include urethane-forming catalysts, silane-coupling agents, thickeners, fillers, thixotropic agents, tackifiers, waxes, heat stabilizers, light stabilizers, fluorescent brighteners, foaming agents, pigments, dyes, conductivity imparting agents, antistatic agents, moisture permeability improvers, water repellents, oil repellents, hollow foams, flame retardants, water absorbents, hygroscopic agents, deodorants, foam stabilizers, antiblocking agents and hydrolysis inhibitors. These additives may be used singly, or two or more may be used in combination.

A leather-like sheet of the present invention has a film obtained by applying the above-described aqueous urethane resin composition onto a substrate and drying the wet film.

Examples of the substrates include release paper; and topcoat layers, intermediate layers and fiber substrates of leather-like sheets. For example, the drying may be performed at 40 to 130° C. for 1 to 10 minutes. The thickness of the film to be obtained is determined appropriately in accordance with the application in which the leather-like sheet is used, and is, for example, in the range of 0.5 to 100 µm.

The film is preferably used as a skin layer and/or a topcoat layer of the leather-like sheet. In this case, the leather-like sheet may be obtained by, for example, a method in which a known adhesive is applied onto the film and the adhesive is dried as required, the film is then compression bonded to a fiber substrate or an intermediate layer of the leather sheet, and the resultant laminate is aged as required, for example, at 30 to 100° C. for 1 to 10 days.

Examples of the fiber substrates include nonwoven fabrics, woven fabrics and knitted fabrics. Examples of the materials of the fiber substrates include polyester fibers, nylon fibers, acrylic fibers, polyurethane fibers, acetate fibers, rayon fibers, polylactic acid fibers, cotton, hemp, silk, wool, and blends of these fibers.

The leather-like sheets obtained by the above method may be used in applications such as, for example, shoes, bags, garments, parts of chairs, sofas and other furniture, automobile interior materials such as car seats and steering wheels; and moisture permeable waterproof materials.

EXAMPLES

Synthetic Example 1

Method for Synthesizing Adhesive (1)

100 Parts by mass of aqueous urethane resin "HYDRAN WLA-500" manufactured by DIC CORPORATION, 1 part by mass of associative thickener "HYDR ASSISTER T5" manufactured by DIC CORPORATION, and 5 parts by mass of isocyanate crosslinking agent "CORONATE 2771" manufactured by TOSOH CORPORATION were added and stirred at 2,000 rpm for 2 minutes with use of a mechanical mixer. The resultant product was degassed with a vacuum degassing device. An adhesive (1) was thus obtained.

Synthetic Example 2

Preparation of Aqueous Urethane Resin Composition (X-1)

In the presence of 3,281 parts by mass of methyl ethyl ketone and 0.1 part by mass of stannous octoate, 1,000 parts by mass of polycarbonate polyol ("NIPPOLAN 980R" manufactured by Nippon Polyurethane Industry Co., Ltd., number average molecular weight: 2,000), 17 parts by mass of 2,2'-dimethylolpropionic acid, 47 parts by mass of ethylene glycol and 344 parts by mass of diphenylmethane diisocyanate were reacted at 70° C. until the solution viscosity reached 20,000 mPa·s. The reaction was terminated by the addition of 3 parts by mass of methanol. Consequently, a methyl ethyl ketone solution of a urethane resin (A-1) was obtained. The urethane resin solution was mixed together with 70 parts by mass of, as a nonionic emulsifier (B), polyoxyethylene distyrenated phenyl ether (Hydrophile-Lipophile Balance (hereinafter, abbreviated as "HLB"): 14, average number of moles of oxyethylene groups added: 10, hereinafter, the compound will be written as "(B-1)") and 13 parts by mass of triethylamine. Thereafter, 800 parts by mass of ion-exchanged water was added to perform phase transition emulsification. Consequently, an emulsion was obtained in which the urethane resin (A-1) was dispersed in water.

Next, methyl ethyl ketone was distilled away from the emulsion, and an aqueous urethane resin composition (X-1) having a nonvolatile content of 40 mass % was obtained.

Synthetic Example 3

Preparation of Aqueous Urethane Resin Composition (X-2)

In the presence of 3,281 parts by mass of methyl ethyl ketone and 0.1 part by mass of stannous octoate, 1,000 parts by mass of polyether polyol ("PTMG2000" manufactured by Mitsubishi Chemical Corporation, number average molecular weight: 2,000), 17 parts by mass of 2,2'-dimethylolpropionic acid, 47 parts by mass of ethylene glycol and 344 parts by mass of diphenylmethane diisocyanate were reacted at 70° C. until the solution viscosity reached 20,000 mPa·s. The reaction was terminated by the addition of 3 parts by mass of methanol. Consequently, a methyl ethyl ketone solution of a urethane resin (A-2) was obtained. The urethane resin solution was mixed together with 70 parts by mass of (B-1) and 13 parts by mass of triethylamine. Thereafter, 800 parts by mass of ion-exchanged water was added to perform phase transition emulsification. Consequently, an emulsion was obtained in which the urethane resin (A-2) was dispersed in water.

Next, methyl ethyl ketone was distilled away from the emulsion, and an aqueous urethane resin composition (X-2) having a nonvolatile content of 40 mass % was obtained.

Synthetic Example 4

Preparation of Aqueous Urethane Resin Composition (X-3)

In the presence of 3,281 parts by mass of methyl ethyl ketone and 0.1 part by mass of stannous octoate, 1,000 parts by mass of polyester polyol ("PLACCEL 220" manufactured by DAICEL CORPORATION, number average molecular weight: 2,000), 17 parts by mass of 2,2'-dimethylolpropionic acid, 47 parts by mass of ethylene glycol and 344 parts by mass of diphenylmethane diisocyanate were reacted at 70° C. until the solution viscosity reached 20,000 mPa·s. The reaction was terminated by the addition of 3 parts by mass of methanol. Consequently, a methyl ethyl ketone solution of a urethane resin (A-3) was obtained. The urethane resin solution was mixed together with 70 parts by mass of (B-1) and 13 parts by mass of triethylamine. Thereafter, 800 parts by mass of ion-exchanged water was added to perform phase transition emulsification. Consequently, an emulsion was obtained in which the urethane resin (A-3) was dispersed in water.

Next, methyl ethyl ketone was distilled away from the emulsion, and an aqueous urethane resin composition (X-3) having a nonvolatile content of 40 mass % was obtained.

Synthetic Example 5

Preparation of Aqueous Urethane Resin Composition (X'-1)

In the presence of 3,723 parts by mass of methyl ethyl ketone and 0.1 part by mass of stannous octoate, 1,000 parts by mass of polycarbonate polyol ("NIPPOLAN 980R" manufactured by Nippon Polyurethane Industry Co., Ltd., number average molecular weight: 2,000), 130 parts by mass of "UNILUB 75DE-60" (manufactured by NOF CORPORATION, polyoxyethylene polyoxypropylene glycol with number average molecular weight of 3,000), 50 parts by mass of "UNILUB 75MB-900" (manufactured by NOF CORPORATION, polyoxyethylene polyoxypropylene glycol monobutyl ether with number average molecular weight of 3,400), 57 parts by mass of ethylene glycol and 360 parts by mass of diphenylmethane diisocyanate were reacted at 70° C. until the solution viscosity reached 20,000 mPa·s. The reaction was terminated by the addition of 3 parts by mass of methanol. Consequently, a methyl ethyl ketone solution of a urethane resin (A'-1) was obtained. The urethane resin solution was mixed together with 79 parts by mass of (B-1). Thereafter, 8,000 parts by mass of ion-exchanged water was added to perform phase transition emulsification. Consequently, an emulsion was obtained in which the urethane resin (A'-1) was dispersed in water.

Next, methyl ethyl ketone was distilled away from the emulsion, and an aqueous urethane resin composition (X'-1) having a nonvolatile content of 40 mass % was obtained.

Synthetic Example 6

Preparation of Aqueous Urethane Resin Composition (X'-2)

In the presence of 3,505 parts by mass of methyl ethyl ketone and 0.1 part by mass of stannous octoate, 1,000 parts by mass of polycarbonate polyol ("NIPPOLAN 980R" manufactured by Nippon Polyurethane Industry Co., Ltd., number average molecular weight: 2,000), 50 parts by mass of 2,2'-dimethylolpropionic acid, 47 parts by mass of ethylene glycol and 407 parts by mass of diphenylmethane diisocyanate were reacted at 70° C. until the solution viscosity reached 20,000 mPa·s. The reaction was terminated by the addition of 3 parts by mass of methanol. Consequently, a methyl ethyl ketone solution of a urethane resin (A'-2) was obtained. The urethane resin solution was mixed together with 38 parts by mass of triethylamine. Thereafter, 800 parts by mass of ion-exchanged water was added to perform phase transition emulsification. Consequently, an emulsion was obtained in which the urethane resin (A'-2) was dispersed in water.

Next, methyl ethyl ketone was distilled away from the emulsion, and an aqueous urethane resin composition (X'-2) having a nonvolatile content of 40 mass % was obtained.

Synthetic Example 7

Preparation of Aqueous Urethane Resin Composition (X'-3)

In the presence of 3,749 parts by mass of methyl ethyl ketone and 0.1 part by mass of stannous octoate, 1,000 parts by mass of polycarbonate polyol ("NIPPOLAN 980R" manufactured by Nippon Polyurethane Industry Co., Ltd., number average molecular weight: 2,000), 180 parts by mass of "UNILUB 75MB-900" (manufactured by NOF CORPORATION, polyoxyethylene polyoxypropylene glycol monobutyl ether with number average molecular weight of 3,400), 18 parts by mass of 2,2'-dimethylolpropionic acid, 49 parts by mass of ethylene glycol and 362 parts by mass of diphenylmethane diisocyanate were reacted at 70° C. until the solution viscosity reached 20,000 mPa·s. The reaction was terminated by the addition of 3 parts by mass of methanol. Consequently, a methyl ethyl ketone solution of a urethane resin (A'-3) was obtained. The urethane resin solution was mixed together with 13 parts by mass of triethylamine. Thereafter, 800 parts by mass of ion-exchanged water was added to perform phase transition emulsification. Consequently, an emulsion was obtained in which the urethane resin (A'-3) was dispersed in water.

Next, methyl ethyl ketone was distilled away from the emulsion, and an aqueous urethane resin composition (X'-3) having a nonvolatile content of 40 mass % was obtained.

Synthetic Example 8

Preparation of Aqueous Urethane Resin Composition (X'-4)

In the presence of 2,902 parts by mass of methyl ethyl ketone and 0.1 part by mass of stannous octoate, 1,000 parts by mass of polycarbonate polyol ("NIPPOLAN 980R" manufactured by Nippon Polyurethane Industry Co., Ltd., number average molecular weight: 2,000), 17 parts by mass of 2,2'-dimethylolpropionic acid, 12 parts by mass of ethylenediamine and 216 parts by mass of diphenylmethane diisocyanate were reacted at 70° C. until the solution viscosity reached 20,000 mPa·s. The reaction was terminated by the addition of 3 parts by mass of methanol. Consequently, a methyl ethyl ketone solution of a urethane resin (A'-4) was obtained. The urethane resin solution was mixed together with 62 parts by mass of (B-1) and 13 parts by mass of triethylamine. Thereafter, 800 parts by mass of ion-exchanged water was added to perform phase transition emulsification. Consequently, an emulsion was obtained in which the urethane resin (A'-4) was dispersed in water.

Next, methyl ethyl ketone was distilled away from the emulsion, and an aqueous urethane resin composition (X'-4) having a nonvolatile content of 40 mass % was obtained.

Example 1

With a mechanical mixer, 100 parts by mass of the aqueous urethane resin composition (X-1) obtained in SYNTHETIC EXAMPLE 2, 1 part by mass of thickener "Borch Gel ALA" manufactured by Borchers and 4 parts by mass of carbodiimide crosslinking agent "CARBODILITE V-02-L2" manufactured by Nisshinbo Chemical Inc. were stirred at 2,000 rpm for 2 minutes. The resultant product was degassed with a vacuum degassing device. A urethane resin blend liquid was thus obtained.

The urethane resin blend liquid obtained was applied onto release paper "155T Flat" manufactured by Dai Nippon Printing Co., Ltd. with a knife coater (clearance: 150 μm) and was dried with a gear-type hot air dryer at 70° C. for 4 minutes and at 120° C. for 2 minutes to give a film.

Next, the adhesive (1) obtained in SYNTHETIC EXAMPLE 1 was applied onto the film with a knife coater (clearance: 150 μm) and was dried with a gear-type hot air dryer at 70° C. for 2 minutes. After the drying, a polyester fiber nonwoven fabric was placed onto the adhesive layer. The stack was compression bonded using a roller temperature-controlled at 120° C. and was aged at 80° C. for 24 hours. After the aging, the release paper was removed. A leather-like sheet was thus obtained.

Examples 2 and 3, and Comparative Examples 1 to 4

Leather-like sheets were obtained in the same manner as in EXAMPLE 1, except that the aqueous urethane resin composition was changed as described in Table 1.

[Chemical Resistance Evaluation Method 1]

The films obtained in EXAMPLES and COMPARATIVE EXAMPLES were each cut to a 5 cm square and soaked in an oleic acid solution. After 24 hours, the size of the film was measured and the swelling ratio was calculated relative to the area before the soaking. "T" indicates that the swelling ratio was not more than 20%, and "F" more than 20%.

[Chemical Resistance Evaluation Method 2]

Onto each of the skin layers constituting the leather-like sheets obtained in EXAMPLES and COMPARATIVE EXAMPLES, filter paper impregnated with the same weight of oleic acid as the skin layer was placed and was allowed to stand as such at 80° C. for 24 hours. Thereafter, the filter paper was removed, and the oleic acid attached to the surface of the skin layer was wiped away with waste cloth.

The wiped surface of the skin layer was visually observed and evaluated under the following criteria.

"A": The appearance was completely intact as compared to the state before the contact with oleic acid, and there was no separation of the skin layer.

"B": Slight swelling was found in very limited regions on the appearance as compared to the state before the contact with oleic acid, but there was no separation of the skin layer.

"C": Obvious swelling was found on the appearance as compared to the state before the contact with oleic acid, but there was no separation of the skin layer.

"D": Obvious swelling was found on the appearance as compared to the state before the contact with oleic acid, and the skin layer had been locally separated.

"E": Most of the skin layer had been separated or dissolved.

[Chemical Resistance Evaluation Method 3]

The leather-like sheets obtained in EXAMPLES and COMPARATIVE EXAMPLES were each soaked in an oleic acid solution and allowed to stand as such at 25° C. for 3 days. Thereafter, the oleic acid attached to the surface of the skin layer was wiped away with waste cloth. Next, the leather-like sheet was dried in an environment at 90° C. for 1 hour. Thereafter, the skin layer side was superimposed on a silicone tube, and, thereon, canvas was caused to rub the skin layer repeatedly under a load of 500 g. The evaluation was made under the following criteria.

"A": The skin layer of the leather-like sheet was not separated after 5,000 times of rubbing.

"B": The skin layer of the leather-like sheet was separated and the substrate was exposed after 5,000 times of rubbing.

"C": The skin layer of the leather-like sheet was separated and the substrate was exposed after 4,000 times of rubbing.

"D": The skin layer of the leather-like sheet was separated and the substrate was exposed after 3,000 times of rubbing.

"E": The skin layer of the leather-like sheet had been separated and the substrate had been exposed before rubbing.

[Chemical Resistance Evaluation Method 4]

Onto each of the skin layers constituting the leather-like sheets obtained in EXAMPLES and COMPARATIVE EXAMPLES, filter paper impregnated with the same weight of a sunscreen oil (BUG SUN manufactured by COPPERTORN) as the skin layer was placed and was allowed to stand as such at 70° C. for 24 hours. Thereafter, the filter paper was removed, and the sunscreen oil attached to the surface of the skin layer was wiped away with waste cloth. The wiped surface of the skin layer was visually observed and evaluated under the following criteria.

"A": The appearance was completely intact as compared to the state before the contact with the sunscreen oil, and there was no separation of the skin layer.

"B": Slight discoloration or swelling was found in very limited regions on the appearance as compared to the state before the contact with the sunscreen oil, but there was no separation of the skin layer.

"C": Obvious discoloration or swelling was found on the appearance as compared to the state before the contact with the sunscreen oil, but there was no separation of the skin layer.

"D": Obvious discoloration or swelling was found on the appearance as compared to the state before the contact with the sunscreen oil, and the skin layer had been locally separated.

"E": Most of the skin layer had been separated or dissolved.

[Discoloration Resistance Evaluation Method]

The leather-like sheets obtained in EXAMPLES and COMPARATIVE EXAMPLES were exposed to 650 ppm NOx gas for 1 hour. The degree of yellowness after the exposure was evaluated as follows.

"A": No yellowing, "B": Light yellow, "C": Dark yellow

TABLE 1

| | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| Urethane resin composition | X-1 | X-2 | X-3 | X'-1 | X'-2 | X'-3 | X'-4 |
| Urethane resin (A) Polyols (a1) | | | | | | | |
| Carboxyl group-containing polyol (a1-1) | DMPA | DMPA | DMPA | | DMPA | DMPA | DMPA |
| Additional polyol | PC | PEt | PEs | PC UNILUB 75DE-60 UNILUB 75MB-900 | PC | PC UNILUB 75MB-900 | PC |
| Aromatic polyisocyanate (a2) | MDI | MDI | MDI | MDI | MDI | MDI | MDI |
| Chain extender (a3) | EG | EG | EG | EG | EG | EG | EDA |
| Urea bond content in urethane resin (A) (mol/kg) | 0 | 0 | 0 | 0 | 0 | 0 | 0.32 |
| Aromatic ring content in urethane resin (A) (mol/kg) | 1.95 | 1.95 | 1.95 | 1.8 | 2.16 | 1.8 | 1.39 |
| Nonionic emulsifier (B) | B-1 | B-1 | B-1 | B-1 | | | B-1 |
| Chemical resistance Swelling evaluation ratio (%) 1 | 7 | 15 | 10 | 20 | 15 | 35 | 7 |
| Evaluation | T | T | T | T | T | F | T |
| Chemical resistance evaluation 2 | A | B | B | C | D | E | C |

TABLE 1-continued

| | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| Chemical resistance evaluation 3 | A | B | B | C | D | E | C |
| Chemical resistance evaluation 4 | A | B | B | D | D | E | C |
| Discoloration resistance evaluation | A | A | A | A | A | A | C |

The abbreviations in Table 1 indicate the following.
"DMPA": 2,2'-dimethylolpropionic acid
"PC": polycarbonate polyol
"PEt": polyether polyol
"PEs": polyester polyol
"EG": ethylene glycol
"MDI": diphenylmethane diisocyanate
"B-1": polyoxyethylene distyrenated phenyl ether
"EDA": ethylenediamine The leather-like sheets of EXAMPLES 1 to 3 in the present invention were shown to have excellent chemical resistance and discoloration resistance.

COMPARATIVE EXAMPLE 1 involved, as the urethane resin (A), a nonionic urethane resin obtained without use of a carboxyl group-containing polyol (a1-1). This embodiment, however, resulted in poor chemical resistance (in particular, oil resistance).

COMPARATIVE EXAMPLES 2 and 3, which represented embodiments without the use of the nonionic emulsifier (B), resulted in poor chemical resistance.

COMPARATIVE EXAMPLE 4, which represented an embodiment in which the urea bond content in the urethane resin was above the range specified in the present invention, resulted in poor chemical resistance and discoloration resistance.

The invention claimed is:

1. A method for producing a leather-like sheet in the form of a laminate including a film, the method comprising forming the film by applying an aqueous urethane resin composition onto a substrate and drying the composition, the aqueous urethane resin composition including a urethane resin (A), a nonionic emulsifier (B) and an aqueous medium (C), the urethane resin (A) being a urethane resin obtained by reacting a polyol (a1) including a carboxyl group-containing polyol (a1-1), an aromatic polyisocyanate (a2) and a chain extender (a3), the urethane resin (A) having a urea bond content of not more than 0.3 mol/kg,
   wherein the content of aromatic rings in the urethane resin (A) is in the range of 0.1 to 5 mol/kg, and
   wherein a thickness of the film is within a range from 0.5 to 100 μm.

2. The method for producing a leather-like sheet according to claim 1, wherein the nonionic emulsifier (B) has an oxyethylene group, and the average number of moles thereof added in the emulsifier is in the range of 1 to 50.

* * * * *